United States Patent
Trika et al.

(10) Patent No.: US 9,652,384 B2
(45) Date of Patent: May 16, 2017

(54) APPARATUS, SYSTEM AND METHOD FOR CACHING COMPRESSED DATA

(71) Applicant: Intel Corporation, Santa Clara, CA (US)

(72) Inventors: Sanjeev N. Trika, Portland, OR (US); Rowel S. Garcia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/572,689

(22) Filed: Dec. 16, 2014

(65) Prior Publication Data

US 2016/0170878 A1    Jun. 16, 2016

(51) Int. Cl.
*G06F 12/08* (2016.01)
*G06F 12/0802* (2016.01)
*G06F 12/0871* (2016.01)

(52) U.S. Cl.
CPC ...... *G06F 12/0802* (2013.01); *G06F 12/0871* (2013.01); *G06F 2212/1044* (2013.01); *G06F 2212/401* (2013.01)

(58) Field of Classification Search
CPC ............. G06F 12/0802; G06F 12/0871; G06F 2212/401; G06F 2212/1044
See application file for complete search history.

(56) References Cited

U.S. PATENT DOCUMENTS

| | | |
|---|---|---|
| 5,537,575 A | 7/1996 | Foley et al. |
| 6,173,381 B1 * | 1/2001 | Dye ................ G06F 12/08 345/555 |
| 6,735,673 B2 | 5/2004 | Kever |
| 6,879,266 B1 | 4/2005 | Dye et al. |
| 2003/0131184 A1 | 7/2003 | Kever |
| 2003/0229761 A1 | 12/2003 | Basu et al. |

(Continued)

FOREIGN PATENT DOCUMENTS

WO    WO-2007107457    9/2007

OTHER PUBLICATIONS

International Search Results and Written Opinion PCT Application No. PCT/US2015/057815 mailed Feb. 11, 2016, 12 pages.

(Continued)

*Primary Examiner* — Hiep Nguyen
(74) *Attorney, Agent, or Firm* — Blakely, Sokoloff, Taylor & Zafman LLP

(57) ABSTRACT

Techniques and mechanisms to efficiently cache data based on compression of such data. The technologies of the present disclosure include cache systems, methods, and computer readable media to support operations performed with data that is compressed prior to being written as a cache line in a cache memory. In some embodiments, a cache controller determines the size of compressed data to be stored as a cache line. The cache controller identifies a logical block address (LBA) range to cache the compressed data, where such identifying is based on the size of the compressed data and on reference information describing multiple LBA ranges of the cache memory. One or more such LBA ranges are of different respective sizes. In other embodiments, LBA ranges of the cache memory concurrently store respective compressed cache lines, wherein the LBA ranges and are of different respective sizes.

21 Claims, 8 Drawing Sheets

(56) References Cited

U.S. PATENT DOCUMENTS

| | | | |
|---|---|---|---|
| 2005/0198062 A1* | 9/2005 | Shapiro | G06F 17/30339 707/102 |
| 2006/0047916 A1 | 3/2006 | Ying et al. | |
| 2006/0101206 A1* | 5/2006 | Wood | G06F 12/0802 711/122 |
| 2007/0104212 A1* | 5/2007 | Gutman | G06F 12/0813 370/428 |
| 2010/0077146 A1 | 3/2010 | Hosoda | |
| 2011/0161560 A1 | 6/2011 | Hutchison et al. | |
| 2013/0304978 A1 | 11/2013 | Trika et al. | |
| 2015/0089126 A1* | 3/2015 | Subramoney | G06F 12/126 711/105 |
| 2015/0095545 A1* | 4/2015 | Lee | G06F 12/0215 711/3 |
| 2015/0113224 A1* | 4/2015 | Achilles | G06F 12/0891 711/135 |
| 2015/0178214 A1* | 6/2015 | Alameldeen | G06F 12/0875 711/125 |
| 2015/0339237 A1* | 11/2015 | Heddes | G06F 12/0875 711/137 |
| 2016/0004636 A1* | 1/2016 | Yang | G06F 12/0802 711/118 |
| 2016/0055094 A1* | 2/2016 | Patsilaras | G06F 12/0893 711/118 |
| 2016/0092361 A1* | 3/2016 | Grimsrud | G06F 12/0238 711/102 |

OTHER PUBLICATIONS

"The fastest hard drive alternative that protects your data," Product Brief; Intel Solid-State Drive 320 series, Non-Volatile Memory Storage Solutions from Intel, Mar. 2011.
International Search Results and Written Opinion PCT Application No. PCT/2015/047758 mailed Dec. 10, 2015, 12 pages.
Non-Final Office Action from U.S. Appl. No. 14/497,392 mailed Mar. 31, 2016, 15 pgs.
Office Action and Search Report for Taiwan Patent Application No. 104127708, dated Aug. 22, 2016, 15 pgs.
Final Office Action from U.S. Appl. No. 14/497,392 mailed Oct. 25, 2016, 15 pgs.
Non-Final Office Action and Search Report for Taiwan Patent Application No. 104136212 mailed Nov. 29, 2016, 10 pgs., (English translation of SR only).

* cited by examiner

| Compressed cacheline sector size | LRU list for compressed cacheline size |
|---|---|
| 1 | 11, 5 |
| 2 | 16, 6, 8 |
| 3 | 2, 0, 7, 9 |
| 4 | 3, 18, 17 |
| 5 | 14, 15 |
| 6 | 4 |
| 7 | 12, 1 |
| 8 | 10, 13 |

LRU lists 230

FIG. 2D

| Compressed cacheline sector size | Free slot list for cacheline size |
|---|---|
| 1 | – |
| 2 | 3 |
| 3 | – |
| 4 | 13, 96 |
| 5 | 71 |
| 6 | – |
| 7 | 64 |
| 8 | – |

Free slot lists 240

FIG. 2E

APPARATUS, SYSTEM AND METHOD FOR CACHING COMPRESSED DATA

BACKGROUND

1. Technical Field

The present disclosure relates to caching technologies. In particular the present disclosure relates to drive caching technologies that employ data compression.

2. Background Art

Electronic devices such as desktop computers, laptop computers, smart phones, tablets, and the like often include one or more peripheral storage devices. For example, a desktop computer may include a hard disk drive (HDD) that includes a magnetic recording medium (disk) that is configured to persistently store data. Although useful, the input/output (e.g., write/read) performance of an HDD may be relatively slow compared to other components of the device. HDDs and other relatively slow storage devices (e.g., tape memory) may therefore bottleneck the performance of the electronic device in which it/they is/are installed. Although many attempts have been made to improve their performance, the electro-mechanical nature of HDDs may practically limit the degree to which their performance may be improved.

One way to relieve a bottleneck presented by a relatively slow peripheral storage device is to use a cache device (also referred to herein as a "cache"). In general, a cache device is a memory device that logically resides between a relatively slow storage device and other components of an electronic device, such as a processor. Typically a cache includes memory that is relatively fast compared to the relatively slow storage device with which the cache device is associated. The memory of the cache device may serve as a temporary storage area for the peripheral storage device. For example frequently accessed ("hot") data may be placed in the cache after it is initially accessed, e.g., from the relatively slow storage device. Subsequent accesses to the hot data may thereafter be made to the cache instead of the relatively slow storage device. A cache controller may apply one or more algorithms and/or policies to determine which data is stored in the memory of the cache device, and which is removed. Because the cache is faster than the relatively slow storage device, the input/output performance of the system may be improved.

Although cache devices can alleviate the performance bottleneck introduced by relatively slow peripheral storage devices, cache memory is often quite expensive. The size of a cache may therefore be limited by cost and/or other considerations. Consequently, the amount of data that may be stored in a cache may be practically limited by the size of its memory.

BRIEF DESCRIPTION OF THE DRAWINGS

The various embodiments of the present invention are illustrated by way of example, and not by way of limitation, in the figures of the accompanying drawings and in which:

FIGS. 2D and 2E illustrate various reference information each accessed to determine data caching operations according to a respective embodiment.

DETAILED DESCRIPTION

Figure 1:
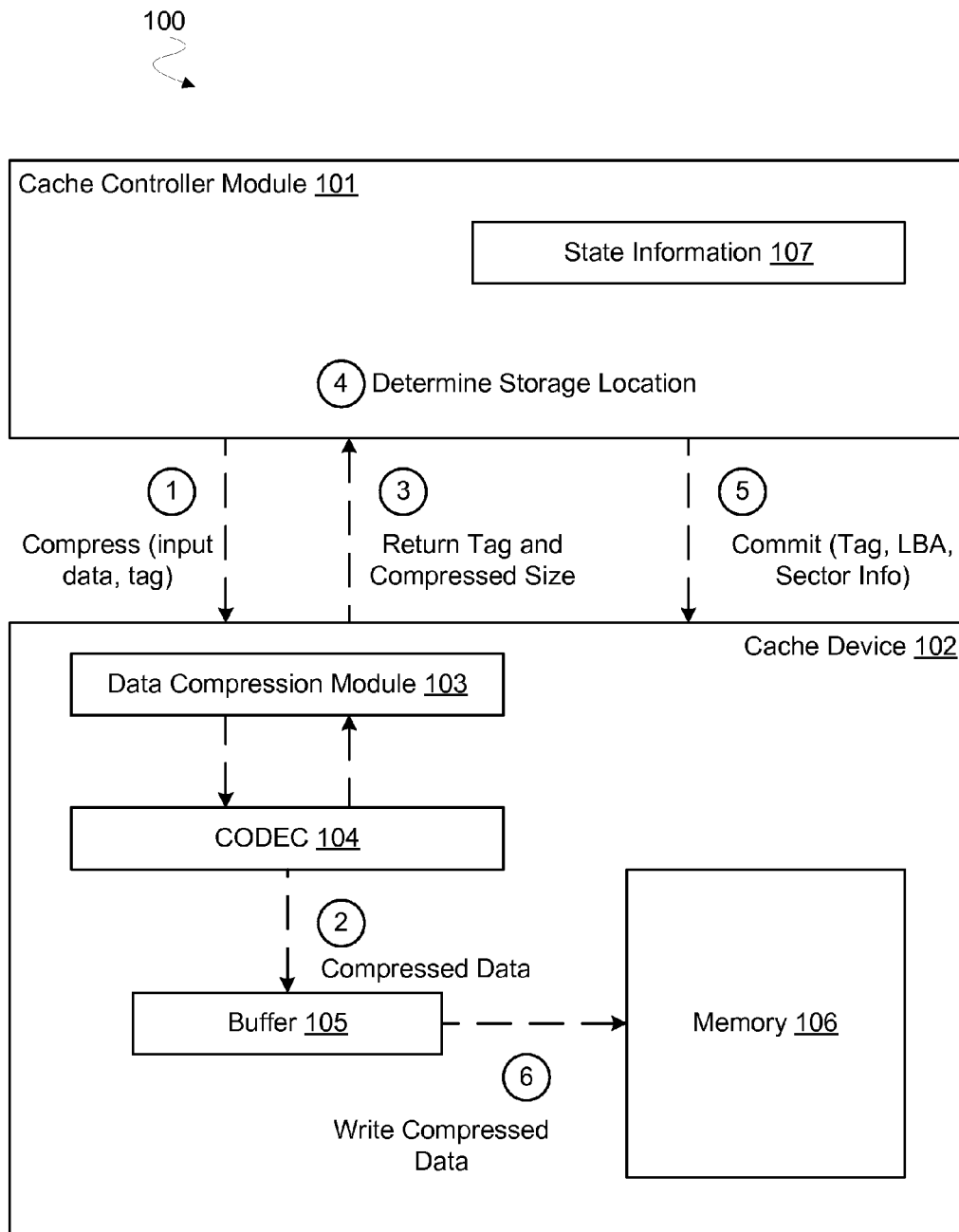
FIG. 1 is a high-level block diagram illustrating elements of a caching system according to an embodiment.

Embodiments discussed herein variously provide techniques and/or mechanisms to improve access to compressed data stored at a cache memory. Some caching architectures are beginning to utilize compression/decompression functionality to increase effective cache capacity, while providing at least some relative improvement to data access times. Generally, such functionality is useful where the additional time required in compressing data to be written to a cache (or in decompressing data to be read from the cache) is less than the time to write an uncompressed version of such data to (or read the uncompressed version of such data from) the relatively slow peripheral storage device.

Conventional disk caching architectures divide up a cache into cache lines of fixed sizes (e.g., 4 kilobyte (KB) cache lines), where such cache lines reside in a logical block addressing (LBA) range of a cache device such as a solid state drive (SSD). In such architectures, cache resources are allocated on a cache line level of granularity—e.g., in units of the predetermined and fixed size of the individual cache lines. Unfortunately, data patterns compress differently. One 4 KB of data in a cache line may compress eight times (8×), and the next 4 KB may not compress at all (i.e., 1×).

For example, conventional SSD caching with compression variously includes dividing a LBA range into slots that each have a fixed size equal to that of an uncompressed cache line. During operation, such slots are variously populated, freed, and overwritten on cache insertions, evictions, and updates as needed. Thus, these cache solutions don't fully benefit from at least part of the logically increased cache capacity. Certain embodiments are a result of a realization that, with fixed sized cache lines, cache control logic is unable to utilize the space in at least some cache lines that are available due to compression. Advantages provided by such embodiments include an effective increase in cache capacity and higher cache hit rates over time.

While the present disclosure is described herein with reference to illustrative embodiments for particular applications, it should be understood that such embodiments are exemplary only and that the invention as defined by the appended claims is not limited thereto. Indeed for the sake of illustration the technologies described herein may be discussed in the context of one or more use models in which a solid state drive is used as cache device for a storage device, such as a hard disk drive or tape memory. Such discussions are exemplary only, and it should be understood that all or a portion of the technologies described herein may be used in other contexts. Indeed the technologies described herein may be used with any suitable cache device and storage device. Those skilled in the relevant art(s) with access to the teachings provided herein will recognize additional modifications, applications, and embodiments within the scope of this disclosure, and additional fields in which embodiments of the present disclosure would be of utility.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any electronic device to which one or both of a cache device and storage device may be coupled and/or installed.

The term "cache device" is used herein to refer to a memory device that is used as a cache for another memory device (hereinafter referred to as a "storage device"). Although the present disclosure focuses on embodiments in which a solid state drive is used as a cache device, it should be understood that such descriptions are exemplary only and that the term "cache device" encompasses any type of memory device that may be used as a cache for a storage device. Without limitation, in some embodiments the cache devices described herein are in the form of a solid state drive, dynamic random access memory (DRAM), a hard drive, a byte addressable non-volatile nonvolatile memory, combinations thereof, and the like. In some embodiments the caching devices described herein exhibit input/output ("I/O") performance that is greater than that of an associated storage device. Therefore in some embodiments, the cache devices described herein may include a memory (also referred to herein as "cache memory") that is faster than the memory of a storage device with which the cache device is associated.

The term "storage device" is used herein to refer to a memory device that may be used to persistently store data. Non-limiting examples of cache devices include hard drives (e.g., drives employing magnetic recording media), solid state drives, tape memory, combinations thereof, and the like. In some embodiments, the storage devices described herein are in the form of one or more memory devices that exhibit I/O performance that is lower than the I/O performance of an associated cache device. Therefore in some embodiments, the storage devices described herein may include a memory (also referred to herein as "storage memory) that is slower than the memory of a cache device with which the storage device is associated.

As used in any embodiment herein, the term "module" may refer to software, firmware, circuitry, and/or combinations thereof that is/are configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more electronic devices, as defined previously. In some embodiments one or more modules described herein may be in the form of logic that is implemented at least in part in hardware to perform one or more functions consistent with the present disclosure.

The terms "solid state drive," "SSD," "SSDs" are interchangeably used herein to refer to any of the wide variety of data storage devices in which integrated circuit assemblies (e.g., non-volatile random access memory (NVRAM) assemblies) are used to store data persistently. In any case, an SSD may be understood to include non-volatile memory such as NAND or NOR memory.

The terms "hard drive" and "HDD" are interchangeably used herein to refer to data storage devices that include magnetic recording media to persistently store data. The term "hybrid hard drive," "hybrid hard drive" and "hybrid HDD" refer to data storage devices that include a combination of integrated circuit assemblies such as NVRAM and magnetic recording media. Hybrid HDDs include so called "dual-drive hybrid systems" (in which a separate SSD and HDD are combined into a hybrid volume, e.g., by an operating system or other controlling hardware/software) and "solid state hybrid drives" in which non-volatile memory such as NAND memory is incorporated into a hard drive.

As noted in the background, cache devices can alleviate at least some of the performance bottleneck that may be introduced by relatively slow peripheral storage devices. However cost and/or other considerations may practically limit the size of the memory that may be included in a cache device. As the amount of data that may be stored in a cache device is limited by the size of the cache memory, this may impose a meaningful constraint on the performance improvements that may be attained through the use of a cache device.

With the foregoing in mind, compressing data that is to be stored in the memory of a cache device may offer significant benefits to cache systems. For example data compression can enable more data to be stored in a cache device without the need to increase the amount of memory therein. However various considerations have made it practically difficult to implement data compression in many cache devices.

For example many cache controllers are configured to divide up received data/state into cache lines that are of a fixed size (e.g., 4 kilobytes (KB), 6 KB, 8 KB, etc.). Thus for example, a cache controller may determine that a 64 KB state should be written to cache memory. To accomplish this, the controller may divide the 64 KB state into sixteen, 4 KB cache lines. The controller may then send a write command to a cache device, resulting in the writing of each 4 KB cache line to storage blocks in the cache memory. As the state contained in the 4 KB cache line is not compressed, the controller will typically allocate a 4 KB block of cache memory for storage.

As noted above the capacity of cache memory in a cache device may be practically increased by compressing the data in each cache line. However the data in each cache line may compress differently, e.g., due to differences in the data patterns contained therein. For example, a data pattern in a first cache line may compress two times (meaning the compressed data is one half the size of the input data), a data pattern in a second cache line may compress eight times (meaning the compressed data is one eighth the size of the input data), whereas a data pattern in a third cache line may not compress at all (meaning the compressed data and input data are the same size). With this in mind, in prior cache systems employing compression the cache controller is not aware of the size of the compressed data in a cache line before the compressed data is written to cache memory. The controllers in such systems therefore generally allocate the full cache line size in the cache memory, even if the size of the compressed data in a given cache line is less than the full cache line size. For example, data in a 4 KB cache line may be compressed to 2 KB, but the cache controller may be unaware of the size of the compressed data. The controller may therefore allocate a 4 KB block in the cache memory for storage of the data in that cache line, even though the size of the compressed data is only 2 KB.

Prior cache systems employing compression are therefore generally unable to directly utilize the additional space that is freed up by the compression. Rather to utilize the advantages made available by compression, such systems must query the cache device after the compressed data is written to determine whether the size of the cache memory has changed and/or to determine the amount of cache memory that is available.

With the foregoing in mind the present disclosure relates to caching technologies that employ data compression. As will be described in detail below, the technologies of the present disclosure include cache systems and methods in which data in a cache line is compressed prior to being written to cache memory. Unlike prior cache systems employing compression, the technologies of the present disclosure enable a caching controller to understand the degree to which data in a cache line is compressed, prior to writing the compressed data to cache memory. In some embodiments, the cache controllers described herein may determine where the compressed data is to be stored in cache memory based at least in part on the size of the compressed data, a compression ratio attributable to the compressed data (or its corresponding input data), or a combination thereof.

One aspect of the present disclosure therefore relates to systems for caching data, which are also referred to herein as caching systems. It is noted that for the sake of clarity and ease of understanding the caching systems described herein are described independently of a host device and/or system in which the cache system may be used and/or installed. It should be understood that the cache systems may be used with and/or installed in any suitable host device or system, which may be in the form an electronic device as defined above and/or a component thereof, such as a solid state drive or other memory device used as cache for one or more peripheral storage devices. Without limitation, the cache systems described herein are particularly suitable for caching one or more storage devices that may be employed in a desktop computer, laptop computer, mobile phone, smart phone, tablet persona computer, server, data center, combinations thereof, and the like. More generally, the cache systems described herein may be implemented in any device that may benefit from caching a relatively slow peripheral storage device.

In this regard reference is made to FIG. 1, which is a block diagram of an example cache system consistent with the present disclosure. As shown, cache system 100 includes cache controller module (CCM) 101 and cache device 102.

Figure 5A:
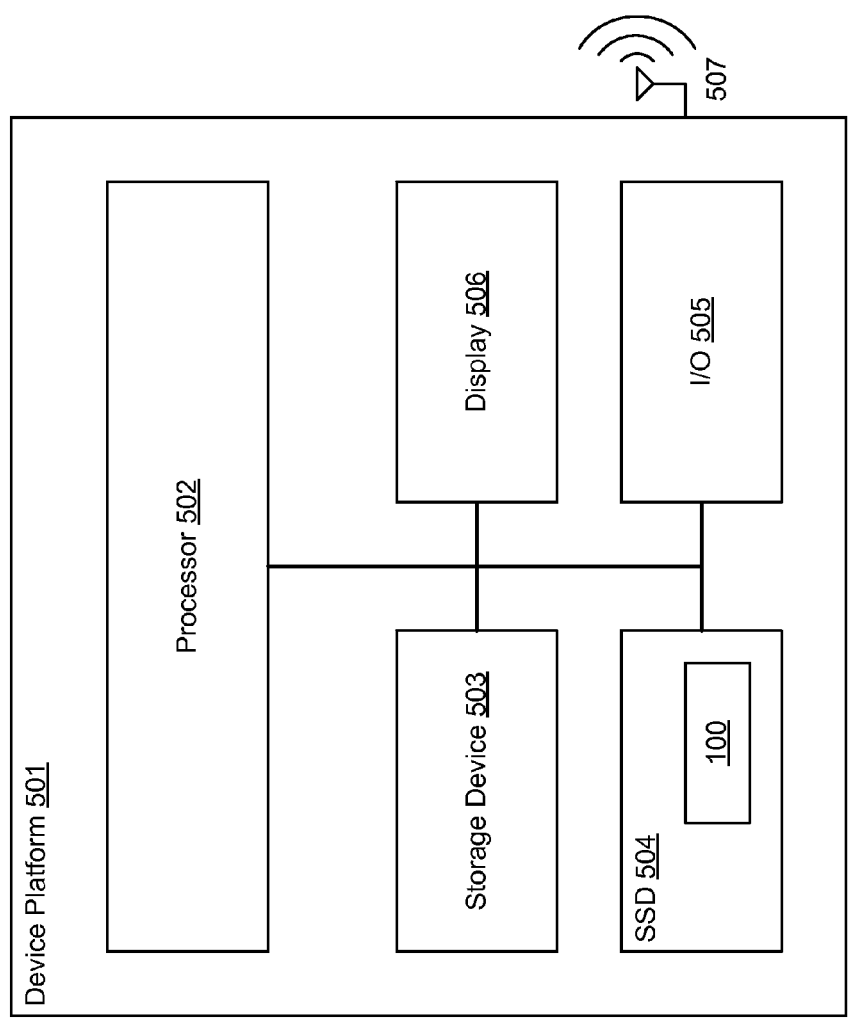
FIGS. 5A and 5B are block diagrams of an example electronic device including a caching system consistent with the present disclosure.
Figure 5B:
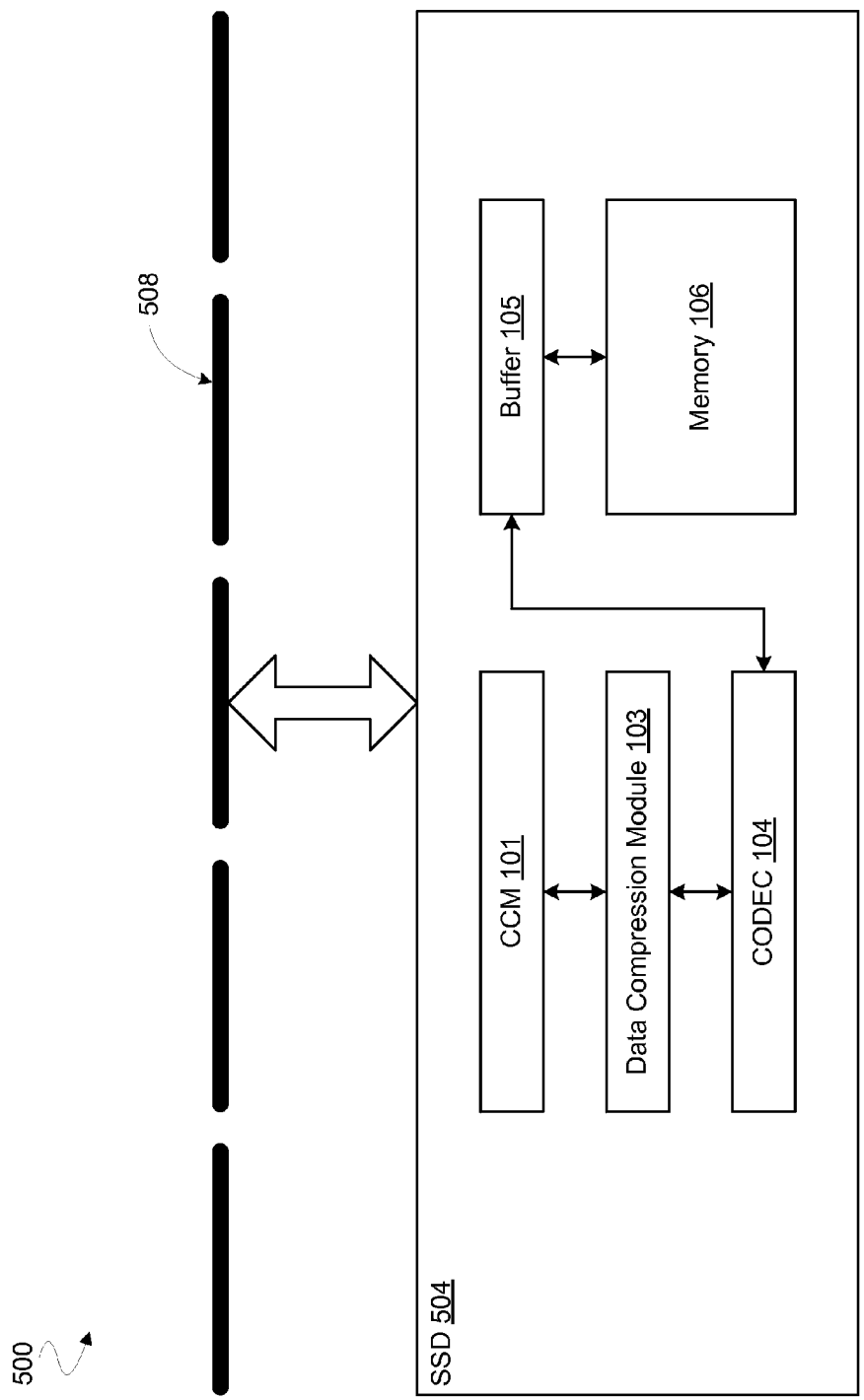

It is noted that CCM 101 is illustrated in FIG. 1 as being separate from cache device 102. It should be understood that such illustration is for the sake of example only, and that CCM 101 may be present at any suitable location. For example and as indicated in FIG. 1, in some embodiments CCM 101 is in the form of a module that is separate from cache device 102. In such embodiments CCM 101 may be installed or otherwise present in an electronic device (e.g., host system, not shown) with which cache system 100 is used. In such instances CCM 101 may be in wired or wireless communication with cache device 102. Alternatively, CCM 101 may be integral with cache device 102, e.g., as shown in FIGS. 5A and 5B. For example, CCM 101 may be in the form of or include an on-board cache controller of cache device 101. In some embodiments, cache system 100 is included in a solid state disk, and CCM 101 is in the form of or includes a SSD controller.

In any case, CCM 101 may be in the form of software, firmware, hardware, logic implemented at least in part in hardware, or a combination thereof which is configured to control the storage of data/state in cache device 102 or, more particularly, in memory 106 of cache device 102. CCM 101 may therefore implement one or more known or future caching policies and/or algorithms to determine which data/state should be stored and/or removed from cache device 102. Alternatively or in addition to such functions CCM 101 may also be configured to determine where data/state is to be stored in memory 106 of cache device 102. As will be described in detail later, CCM 101 may allocate blocks (e.g., logical block addresses or LBAs) within memory 106 based at least in part on the size of compressed data/state, a compression ratio attributable to the compressed data/state, or a combination thereof.

Cache device 102 may be any data storage device that is suitable for caching a relatively slow peripheral storage medium (not shown). Non-limiting examples of suitable data storage devices that may be used as cache device 102 include solid state drives, hard drive drives, dynamic random access memory (DRAM) devices, combinations thereof, and the like. Consistent with the foregoing description, cache device 102 may in some embodiments be any data storage device that exhibits input/output (write/read) performance that is greater than that of the peripheral storage medium for which the data storage device is to be used as cache. Without limitation, in some embodiments cache device 102 is in the form of a solid state drive.

As shown in FIG. 1, cache device 102 includes data compression module (DCM) 103, compression decompression engine (CODEC) 104, transfer buffer (buffer) 105, and memory 106. DCM 103 generally functions to communicate with CCM 101 and to cause cache device 102 to perform data compression operations consistent with the present disclosure. Further detail regarding the operation of DCM 103 will be provided later.

Compression decompression engine CODEC 104 generally functions to compress data received from CCM 101. In particular and as will be described below, CODEC 104 may receive data in a cache line from CCM 101 (or, more particularly, from DCM 103). For the sake of clarity the data received by CODEC 104 is referred to as input data. While the present disclosure describes embodiments in which the CODEC operates on input data from a single cache line, it should be understood that such description is for the sake of example and that CODEC may be configured to operate on input data from multiple cache lines. Thus for example, CCM 101 may divide a pool of data into a plurality of cache lines, each of which contains input data (e.g., 4 KB, 8 KB, etc.). CCM 101 (or DCM 103) may send the input data from one or more of the cache lines to CODEC 104 for compression. Depending on its configuration, CODEC 104 may operate one only one of the sets of input data (i.e., input data from one cache line) at a time, or it may operate on multiple sets of input data (i.e., input data from multiple cache lines) simultaneously.

CODEC 104 may then perform compression operations on the input data, e.g., using one or more compression algorithms, so as to produce a compressed output. As may be appreciated, the size of the compressed output may differ from the size of the input data. The relative difference between the size of the compressed output and the input data may be represented by a compression ratio, which in some embodiments may be determined by dividing the size of the input data by the size of the compressed output, or vice versa. Thus for example if the size of the input data is 4 KB and the size of the compressed output is 2 KB, the compression ratio may be 0.5 or 2, depending on how the ratio is calculated.

Non-limiting examples of compression algorithms that may be executed by CODEC 104 include the Lempel-Ziv (LZ) algorithm, the Deflate algorithm, the LZR algorithm and combinations thereof. Of course, these algorithms are exemplary only, and any suitable compression algorithm (and in particular lossless compression algorithms) may be used. Without limitation, in some embodiments CODEC 104 executes the Lempel-Ziv algorithm on data/state received from CCM 101 (or, more particularly, from DCM 103).

FIG. 1 illustrates an embodiment wherein CODEC 104 is integral to cache device 102. It should be understood that this illustration is for the sake of example only, and the CODEC 104 need not be integral to cache device 102. Indeed the present disclosure envisions embodiments in which CODEC 104 is stored and/or implemented at any suitable location. For example, CODEC 104 may be a hardware codec implemented by other hardware of a host system, such as a video card or other hardware accelerator. Alternatively or additionally, CODEC may be a software codec that is executed by a processor, e.g., of a host system.

Regardless of the nature of CODEC 104, the compressed output produced by CODEC 104 may be stored in buffer 105. Accordingly, buffer 105 may be configured to store the compressed output of codec 105. In particular, buffer 105 may store the compressed output of codec 105 prior to writing the compressed output to memory 106 of cache device 102. As will be described later, writing the compressed output to memory 106 may be conditioned on the receipt of a data write command (e.g., a write command), e.g., from CCM 101. Moreover prior to commission of the compressed output to memory 105 (e.g., while the compressed output is stored in buffer 105), the location to which the compressed output is to be written (e.g., logical block addresses in memory 106) may be determined by CCM 101, as will be described further below. Buffer 105 may therefore be understood to be a transfer buffer that may store the compressed output of codec 104 prior to commission of the compressed output to cache memory 106.

Buffer 105 may be any memory structure that is suitable for storing the compressed output. Non-limiting examples of suitable memory structures that may be used as buffer 105 include static random access memory (SRAM), embedded dynamic random access memory, combinations thereof, and the like. Without limitation, in some embodiments the size of buffer 105 is greater than or equal to about the size of the cache lines received from CCM 101. Thus for example where CCM 101 transmits 4 KB cache lines to cache device 102, the size of buffer 105 may in some embodiments be greater than or equal to about 4 KB. Of course this is for the sake of example only, and buffer 105 may be any desired size.

Memory 106 may be any suitable type of computer readable memory. Exemplary memory types that may be used as memory 106 include but are not limited to: phase change memory (PCM), a byte addressable three dimensional cross point memory, a resistive memory, nanowire memory, ferro-electric transistor random access memory (FeTRAM), flash memory such as NAND or NOR memory, magnetoresistive random access memory (MRAM) memory that incorporates memristor technology, spin transfer torque (STT)-MRAM, magnetic drive memory, optical drive memory, combinations thereof, and the like. Additionally or alternatively, memory 106 may include other and/or later-developed types of computer-readable memory.

Without limitation, in some embodiments memory 106 is a type of memory that is typically associated with the type of memory device used as cache device 102. Thus for example, when cache device 102 is a solid state drive, memory 106 may be in the form of non-volatile memory. Likewise when cache device 102 is a hard drive, memory 106 may be in the form of a magnetic recording medium. Without limitation, in some embodiments cache device 102 is in the form of an SSD, and memory 106 is in the form of non-volatile memory (e.g., NAND memory). In any case, memory 106 may be configured to store data in one or more logical blocks, which may be addressed, e.g., with a memory controller or other component of cache device 102. That is, memory 106 may include or be arranged in a plurality of logical block addresses (LBAs), at which data/state may be stored. Data may be written to memory 106 in response to a data write command as generally understood in the art. The data write command may be in the form of a write command that specifies the logical block addresses within memory 106 to which data/state associated with the command is to be written.

For the sake of example the present disclosure will now proceed to describe the operation of an embodiment of cache system 100 in which cache device 102 is in the form of an SSD and memory 106 is in the form of non-volatile memory. It is stressed that the following description is for the sake of example, and that the operations described in association with this example may be employed with any suitable cache device.

With further reference to FIG. 1, CCM 101 may receive data from a data source, such as a processor or another component of a host system in which cache system 100 may be installed. As noted above CCM 101 may apply one or more caching polies to determine whether all or a portion of the data is to be written to memory 106. When CCM 101 determines that all or a portion of the data is to be written to memory 106, it may allocate the to-be written data to one or more cache lines, which may be fixed or variable in size. Without limitation, in some embodiments the cache lines have a fixed size, e.g., 4 KB, 6 KB, 8 KB, 16 KB, 32 KB, 64 KB, etc.

CCM 101 may also assign a tag to the data in a cache line. In general, the tag functions as an identifier of a particular unit of data, in this case the data that is allocated to a one of the cache lines. The tag may therefore be in any format suitable to uniquely identify the data in a cache line with which the tag is associated. Thus for example, CCM 101 may assign a first tag "A" to data in a first cache line, and a second tag "B" to data in a second cache line, etc. The nature and format of the tag associated with a cache line is not limited, so long as it is able to uniquely identify the data in the cache line. Thus for example, the tag may be in the form of a 32-bit, 64-bit, 128-bit, or 256-bit sequence number, a hash of the data in the cache line, combinations thereof, and the like. Without limitation, in some embodiments the tag is in the form of a 64-bit sequence number.

CCM 101 may then send the data in a cache line to cache device 102 for compression, as illustrated by point 1 of FIG. 1. In this regard, CCM 101 may send compress command to cache device 102, e.g., in one or more wired or wireless signals. The compress command may be in any suitable format, such as a vendor specific command under any previous, current or future developed version of the serial advanced technology attachment (SATA) standard or nonvolatile memory express (NVMe) standard. NVMe, or Non-Volatile Memory Host Controller Interface Specification (NVMHCI), is a specification for accessing SSDs attached through the PCIe bus. See, for example, NVM Express Revision 1.2 specification ratified on Nov. 3, 2014 and available for download at http://nvmexpress.org. In any case the compress command may include a copy of the tag, the input data for compression (i.e., the data in a cache line), and optionally a measurement of the uncompressed size of the input data in the command. This concept is illustrated in FIG. 2, wherein compress command 201 is illustrated in the form of a single command that includes the tag, the input data, and optionally a measurement of the uncompressed size of the input data. Of course the compress command may include other elements as desired, such as but not limited to a command header. The compress command may also include or be associated with one or more compress instructions, which may be configured to cause CODEC 104 to perform compression operations on the input data. Of course, the tag, data, and compress instruction need not be included in the same command, and may be included in different commands as desired.

DCM 103 may receive the compress command directly from CCM 101, or the compress command may be forwarded to DCM 103 from other components of cache device 102. In any case, in response to the compress command DCM 103 may forward the input data received from cache controller module to CODEC 104 for compression. In response, CODEC 104 may execute one or more compression operations on the input data, e.g., using one or more compression algorithms as previously described. As illustrated at point 2 of FIG. 1, CODEC 104 may store the resulting compressed output in transfer buffer 105. CODEC 104 may then report the completion of the compression operation and the location of the compressed output (e.g., an identifier of buffer 105, address ranges within buffer 105, etc.) to DCM 103.

Figures 2A, 2B:
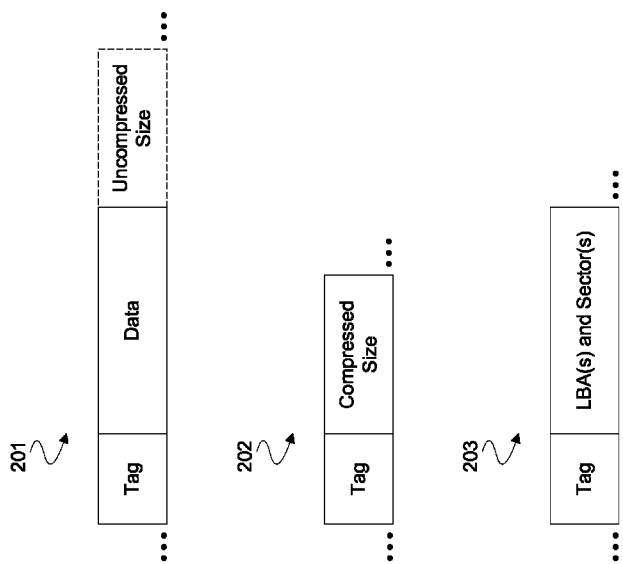
FIG. 2A illustrates elements of commands variously exchanged each in a cache system according to a respective embodiment.
FIG. 2B illustrates reference information accessed to determine data caching operations according to an embodiment.

As illustrated at point 3 of FIG. 1, DCM 103 may communicate a return message to CCM 101. The return signal may include the tag assigned to the input data, as well as a measurement of the size of the compressed output stored in DCM 103. This concept is shown in FIG. 2A, wherein return message 202 is illustrated as including the tag and the size of the compressed output. Therefore in some embodiments, DCM 103 may measure or otherwise determine the size of the compressed output stored in buffer 105, and include the determined size in a return command. Alternatively or additionally, CODEC 104 may be configured to automatically communicate the size of the compressed data to DCM 103, e.g., after it compresses the input data.

While the present disclosure envisions embodiments in which DCM 101 automatically issues a return message specifying the compressed size and tag to CCM 101, the systems of the present disclosure need not be configured in that manner. Indeed in some embodiments, DCM 103 may condition the issuance of a return message on receipt of a query message from CCM 101. For example as input data from CCM 101 is compressed by CODEC 104 and stored in transfer buffer 105, DCM 103 may maintain a record (e.g., a table or other data structure) correlating tags associated with input data (e.g., various different cache lines) received from CCM 101 with the size of the compressed output associated with the tags, as well as the location of the compressed output (e.g. in buffer 105). DCM 101 may then await receipt of a query command from CCM 101. For example, CCM 101 in some embodiments may transmit a query command to DCM 103, wherein the query command includes a query instruction and a tag. In response to the query command, DCM 103 may look up the size of the compressed output associated with the tag, and send a return message including the tag and the size of the compressed output to CCM 101 as discussed above.

In any case as illustrated at point 4 of FIG. 1, CCM 101 may receive a return message from cache device 102 (or more particularly, from DCM 103). In response to receipt of the return message, CCM 101 may analyze the return message to identify the tag and the size of the compressed data. Through this analysis, CCM 101 can determine the degree to which the input data associated with the tag was compressed by CODEC 104. Put in other terms, by analyzing the return message, CCM 101 can determine the size of the compressed output stored in buffer 105. Because the compressed output in associated with the tag (in the return message) and the tag was associated with the input data (in the compress command), CCM 101 can therefore determine the size of the compressed output, and/or the degree to which the input data was compressed by CODEC 104 (i.e., the input data's compression ratio).

CCM 101 may then determine where the compressed output is to be stored in memory 106. In this regard CCM 101 may have knowledge of the logical block addresses (LBAs) within memory 106, as well as the current state of those logical block addresses (e.g., as being written, unwritten, etc.). For example CCM 101 may maintain an LBA table that identifies all of the LBAs in memory 106. Based at least in part on the size of the compressed output and/or the compression ratio attributable to the input data, CCM 101 may then allocate one or more LBAs within memory 106 for storage of the compressed output.

As shown at point 5 of FIG. 1, CCM 101 may then issue a write command to cache device 102. In general, the write command may be configured to cause cache device 102 to write a compressed output stored in buffer 105 to one or more LBAs of memory 106. Accordingly, the write command may include a tag associated with a compressed output (and corresponding input data) as well as one or more LBAs to which the compressed output is to be written. This concept is illustrated in FIG. 2A, wherein write command 203 is illustrated as a single command including a tag and one or more LBAs in memory 106 to which the compressed output associated with the tag is to be written. A write/commit instruction (not shown) may also be included in the command or separately transmitted by CCM 101, as desired.

Turning now to point 6 of FIG. 1, DCM 103 may be configured to receive the write command from CCM 101. In response to the write command, DCM 103 may cause cache device 102 to write the compressed data associated with the tag identified in the write command from buffer 105 to the one or more logical block addresses of memory 106 specified in the write command. Writing the compressed data from buffer 105 to memory 106 may occur in any previously known or to be developed manner, and therefore is not discussed herein.

For the sake of clarity the above discussion focused on an embodiment in which CCM 101 determines that a compressed output stored in buffer 105 is to be written to memory 106 of cache device 102. It should be understood that the above discussion is for the sake of example only, and that a compressed output stored in buffer 105 need not always be written to memory 106 of cache device 102. Indeed the present disclosure envisions embodiments in which CCM 101, in response to a return message, determines that a compressed output stored in buffer 105 is not to be written to memory 106.

By way of example, in some embodiments CCM 101 may analyze a return message to determine the size of a compressed output stored in buffer 105, and/or a compression ratio attributable to input data, as discussed above. In such embodiments CCM 101 may also be configured to determine, based at least in part on the compression ratio and/or the size of the compressed output, whether to write the compressed output to memory 106. For example CCM 101 may compare the compression ratio attributable to input data to a threshold compression ratio, and determine whether or not the compressed output is not to be written to memory 106 based at least in part on whether the compression ratio attributable to the input data exceeds the threshold compression ratio, or not. Alternatively or additionally, CCM 101 may compare the size of the compressed output in buffer 105 to a threshold size, and determine whether or not the compressed output is to be written to memory 106 based at least in part on whether the size of the compressed output exceed the threshold size, or not.

In instances where CCM 101 determines that the compressed output is not to be written to memory 106, CCM 101 may issue a discard command to cache device 102 (or, more particularly, to DCM 103). The discard command may include, for example, a discard instruction and a tag. In response to the discard command, DCM 103 may cause the cache device 102 to purge the compressed output associated with the tag from buffer 105.

As discussed above the present disclosure envisions embodiments in which CCM 101 associates a tag with cache line data that is to be compressed, DCM 103 associates the tag with the compressed data stored in transfer buffer 105, and CCM issues a write command containing the tag to write the compressed data to memory 106. Although useful it should be understood that such embodiments are for the sake of example, and that the present disclosure envisions embodiments in which a tag is not used to identify data in a cache line. For example, CCM 101 may be configured to transmit a compress command to cache device 102, as noted above. Unlike the foregoing embodiments however, the compress command may contain data/state from a cache line for compression, but may not contain a tag. In response to the compression command, DCM 103 may forward the data/state to CODEC 104 for compression, after which the compressed output may be stored in the transfer buffer 105. DCM 103 may then send a return signal to CCM 101, signaling completion of the compression operation and the location/identification of transfer buffer 105 in which the compressed output is stored.

When CCM determines that the compressed output is to be written to memory 106, it may issue a read command to cache device 102. The read command may target the transfer buffer 105, and cause cache device 102 to provide the content of transfer buffer 105 to cache controller 101. CCM 101 can then determine the size and/or compression ratio of the data read from transfer buffer 105, and allocate logical block addresses within memory 106 for the storage thereof. CCM 101 can then issue a write command to cache device 102, including the compressed output and the allocated LBAs of memory 106. In response to the write command, cache device 102 may write the compressed output to the allocated LBA's specified in the write command.

As may be appreciated, such embodiments may allow CCM 101 to determine the size and/or compression ratio of the compressed output prior to writing the compressed output to memory 106 while avoiding the overhead associated with generating and tracking a tag for each cache line, though potentially at the expense of having to wait for compression to complete on state for a given cache line before additional data may be sent.

As noted previously the cache systems of the present disclosure be included in one or more cache devices and/or electronic devices, e.g., and may cache one or more storage devices. This concept is illustrated in FIG. 5A, which depicts a block diagram of an electronic device including a cache system consistent with the present disclosure. As shown, electronic device 500 includes device platform 501, processor 502, storage device 503, a cache device (in this case SSD 504), input/output interface/device 505 (e.g., a keyboard, mouse, wireless network interface etc.), display 506 and one or more antennae 507. SSD 504 includes a cache system 100, further details of which are shown in FIG. 5B. Accessing a compressed cache line with SSD 504 may determine at least in part one or more other operations of platform 501—e.g., including the displaying of an image with display 506, a wireless network communication with one or more antennae 507 and/or the like.

Electronic device 500 may be any suitable electronic device, such as the electronic devices described above. Non-limiting examples of electronic devices that may be used as electronic device 500 therefore include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like.

Device platform may be any suitable device platform, and in some embodiments correlates to the type of electronic device used as electronic device 500. Thus for example where electronic device 500 is a smart phone, notebook computer, desktop computer, server, etc., device platform 501 may be in the form of a smart phone platform, a notebook computer platform, a desktop computer platform, a server platform, respectfully. Of course such device platforms are for the sake of example only, and any suitable device platform may be used as device platform 501.

Processor 502 may be any suitable general purpose processor or application specific integrated circuit, and may be capable of executing one or multiple threads on one or multiple processor cores. Without limitation, in some embodiments processor 502 is a general purpose processor, such as but not limited to the general purpose processors commercially available from INTEL® Corp., ADVANCED MICRO DEVICES®, ARM®, NVIDIA®, APPLE®, and SAMSUNG®. While FIG. 5A illustrates electronic device 500 as including a single processor 502, multiple processors may be used.

Storage device 503 may be any suitable storage device, such as but not limited to the storage devices noted above. Without limitation, in some embodiments storage device 503 is in the form of an SSD, a hard disk drive, tape memory, combinations thereof, and the like. In some embodiments storage device 503 may exhibit input output performance that is slower than the input output performance of the cache device used in in electronic device 500, in this case SSD 504.

Reference is now made to FIG. 5B, which provides further details of SSD 504 in FIG. 5A and other components of electronic device 500. As shown in FIG. 5B, SSD 504 may communicate with bus 508 (of device platform 501), e.g., via interface 505. In this regard, any suitable bus may be used as bus 508, and any suitable interface may be used as interface 505. Without limitation, bus 508 in one embodiment is a serial advanced technology attachment (SATA) bus, and interface 505 is a SATA interface. As further shown in FIG. 5B, SSD 504 may include cache controller module (CCM) 101, data compression module (DCM) 103, CODEC 104, buffer 105, and memory 106. For the sake of illustration CCM 101, DCM 103, and CODEC 104 are shown as separate elements of SSD 504, but it should be understood that such a configuration is not necessary. Indeed in some embodiments, one or a combination of such elements may be integrated or otherwise included in a SSD controller (not shown) of SSD 504.

In operation, bus 508 may carry data (e.g., from processor 502) to SSD 504. SSD 504 may receive the data, e.g., via interface 505. The received data may then be conveyed to CCM 101. At that time CCM 101 may apply one or more cache policies to determine whether all or a portion of the data is to be written to memory 106. If so, CCM 101 may divide the data into one or a plurality of cache lines as previously discussed, and send one or more of the cache lines (optionally marked with a tag) to DCM 103 for compression. As discussed above, DCM 103 may send data (input data) to CODEC 104 for compression. CODEC 104 may compress the input data to produce an output, which is stored in buffer 105.

CCM 101 may then determine the size of the compressed output and/or a compression ratio attributable to the input data, and may apply one or more caching policies to determine whether the compressed output is to be written to memory 106. As discussed previously that decision may be predicated at least in part on the size of the compressed output and/or the compression ratio attributable to the input data. When the compressed output is to be written to memory 106, CCM 101 may allocate at least one logical block address range in memory 106 for the storage of the compressed output. CCM 101 may then send a write command to a disk controller (not shown) of SSD 504, wherein the write command causes the controller to write the compressed output stored in buffer 105 to the logical block address range(s) of memory 106 allocated by CCM 101. Alternatively where CCM 101 is integral with or in the form of a disk controller of SSD 504, CCM 101 may itself cause the compressed output in buffer 105 to be written to the allocated logical block address range(s) of memory 106. Likewise in instances where the compressed output is not to be written to memory 106, CCM 101 may issue a discard command, causing the compressed output to be purged from buffer 105, e.g., before it is written to memory 106.

Another aspect of the present disclosure relates to methods of caching data. In this regard reference is made to FIG. 3, which is a flow chart of example operations of a cache controller device, such as cache controller module 101, in accordance with an example method of caching data consistent with the present disclosure. As shown, the method 300 may include, at 310, transmitting a first compress command comprising first data. The first compress command may be transmitted at 310 to a device including a compression engine that, in response to the first compress command, compresses the first data to produce first compressed data. In an embodiment, the cache controller performing method 300 stores information associating the first data with a first tag that, for example, may be used to access the first data (and/or the first compressed data). The first tag may be included in the first compress command, for example.

Method 300 may further comprise, at 320, determining a size of the first compressed data. For example, the compression engine may directly or indirectly communicate to the cache controller information specifying a total number of bits, bytes, blocks or other sets of data comprising the first compressed data. Alternatively or in addition, such information may specify a compression ratio of the first compressed data relative to the first data.

In an embodiment, method 300 further comprises, at 330, identifying a first logical block address (LBA) range of a memory of a cache device. The first LBA range may be identified based on the size of the first compressed data, as determined at 320, and reference information included in or otherwise accessible to the cache controller. The reference information may include one or more tables, lists, trees or other data structures that specify a plurality of LBA ranges (also referred to herein as slots) of the memory of the cache device, where such LBA ranges are each currently storing a respective cache line and/or may be available for storing a respective cache line. Such reference information may be maintained to keep track of, for each of the plurality of LBA ranges, information such as a size of the LBA range, a corresponding logical base address of a peripheral storage device, a recency of use of the LBA range and/or the like. Some or all such information may be ordered e.g., slot size, slot recency of use or the like.

By way of illustration and not limitation, the reference information may identify one or more LBA ranges that each currently store a respective compressed cache line and/or one or more LBA ranges that currently store no valid compressed cache line. For example, the reference information may include information identifying one or more LBA ranges other than any LBA ranges of the cache memory that currently store valid data, wherein the reference information further identifies for each of such one or more LBA ranges a respective size of the LBA range. The plurality of LBA ranges may include, during the identifying at 330, some LBA ranges of different respective sizes.

In one embodiment, the reference information specifies, for each of a plurality of LBA ranges, a recency of use of that LBA range. The identifying of the first LBA range at 330 may be based on a recency of use of the first LBA range— e.g., as compared to a recency of use of one or more other LBA ranges that, for example, each have a size equal to that of the first LBA range. The identifying the first LBA range at 330 may include identifying compressed data to evict from the cache memory—e.g., including identifying a relatively low hit rate of the first LBA range as compared to that of one or more others of the plurality of LBA ranges.

The identifying of the first LBA range at 330 may include identifying a subset of the plurality of LBA ranges—e.g., based on the LBA ranges of that subset each having a respective total number of sectors that is equal to a minimum number of sectors sufficient to store the first compressed data. Alternatively or in addition, a subset of the plurality of LBA ranges may be identified based on the LBA ranges of the subset each having a total number of sectors of the LBA range that, of the available LBA ranges, is closest to (and not less than) the minimum number of sectors sufficient to store the first compressed data. The first LBA range may be selected from among only the subset of the plurality of LBA ranges—e.g., where such selection is based on the first LBA range being a least recently used LBA range of the subset.

The identifying the first LBA at 330 may include dividing one LBA range of the plurality of LBA ranges currently identified by the reference information. A LBA range may be divided, for example, into the first LBA range and some other LBA range that, for example, may store no valid data after method 300. In such an embodiment, the dividing of a LBA range may be based on the size of the first compressed data—e.g., so that the first LBA range has at least a minimum number of sectors to store the first compressed data.

Method 300 may further comprise, at 340, updating the reference information to indicate that the first LBA range is allocated to the first compressed data. The updating at 340 may include updating the plurality of LBA ranges specified to include information identifying the first LBA range. Alternatively or in addition, the updating may include generating or updating a value representing a recency of use of the first LBA range.

In an embodiment, method 300 comprises, at 350, signaling that the first compressed data is to be written to the first LBA range. For example, the signaling at 350 may include the cache controller issuing a write command, a commit command and/or other message to a cache memory or other device that directly or indirectly operates the cache memory. Such a message may contain an identifier of the first LBA range and, in some embodiments, a tag recognized as an index or other value to reference the first data (and first compressed data). As discussed herein, a compression engine or other component coupled to the cache controller may temporarily store the first compressed data after a size of the first compressed data has been communicated to the cache controller, and at least until the cache controller engine has identified to the component a particular cache LBA range to which the component is to write the first compressed data. Alternatively, the first compressed data may be temporarily stored in a buffer, wherein after determining a cache LBA range based on the size of the first compressed data, the cache controller reads the first compressed data from the buffer and writes it to the cache LBA range.

Figure 3:
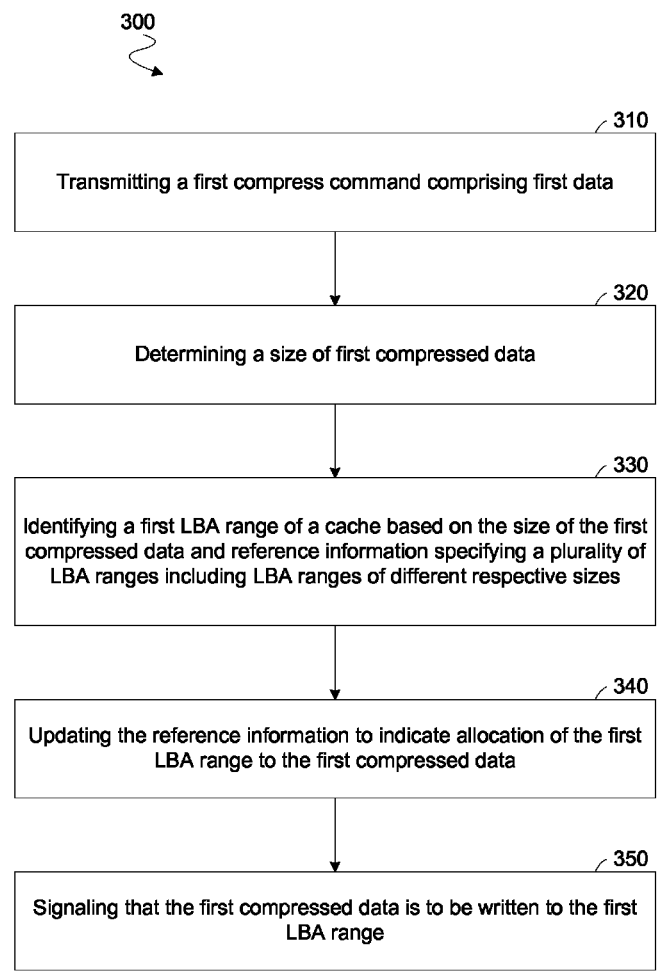
FIG. 3 is a flow diagram illustrating elements of a method for controlling a cache according to an embodiment.

Method 300 may include other operations (not shown), variously preceding and/or follow those shown in FIG. 3, that support the caching of other data. By way of illustration and not limitation, operations 310 through 350 may be repeated for second data other than the first data. Compression of such second data may result in second compressed data that, for example, has a size different than that of the first compressed data. The cache controller may receive—e.g., from a compression engine—information identifying the size of the second compressed data and, in response, may identify a second LBA range of the cache memory. The second LBA range may be identified based on the size of the second compressed data and a size of the second LBA range—e.g., where the first LBA range and the second LBA range are of different sizes. Based on identification of the second LBA range, method 300 may further update the reference information to indicate that the second LBA range is allocated to the second compressed data. The second compressed data may be written to the second LBA range—e.g., wherein the first LBA range stores the first compressed data while the second LBA range stores the second compressed data.

FIGS. 2B, 2D and 2E illustrate some examples of reference information that may be accessed to determine a caching and/or other accessing of compressed data according to an embodiment. Such reference information may be included in or otherwise accessible to a cache controller (such as cache controller module 101) for reference in determining the caching of compressed data to respective LBA ranges of different sizes. The particular structure and content of such reference information is merely illustrative of a scenario according to one embodiment, and may not be limiting on other embodiments.

As shown in FIG. 2B, the reference information may include a LBA mapping 210 that defines or otherwise specifies the correspondence of LBAs of a peripheral storage (in this example, a HDD) each to a respective LBA range of a cache for the peripheral storage. In LBA mapping 210, cache LBA ranges are each indicated by a respective first LBA of the LBA range (in the column "Cache LBA") and a total number of sectors (in the column "Compressed size") of the LBA range that is storing (and/or in some embodiments, is available to store) compressed data. In the illustrative scenario represented by FIGS. 2B-2E, the size of an uncompressed cache line is 4 KB (8 LBAs, where each LBA is 512 bytes).

Figure 2C:
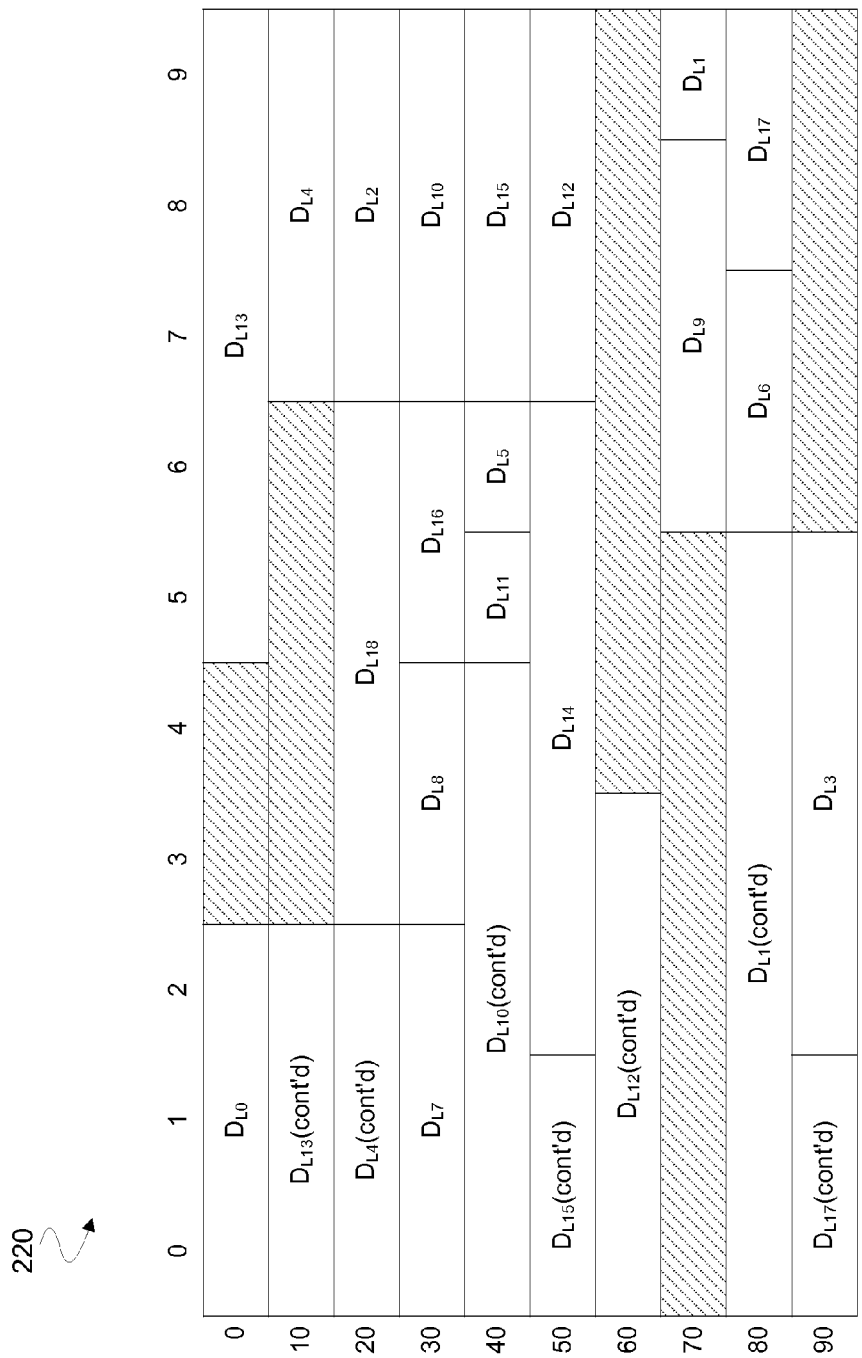
FIG. 2C illustrates a data cache to provide access to compressed data according to an embodiment.

FIG. 2C illustrates elements of a cache memory 220 described by the illustrative reference information shown in LBA mapping 210. The illustrative cache memory 220 includes one hundred LBAs, where LBA ranges of cache memory 220, specified in LBA mapping 210, concurrently store respective compressed cache line data $D_{Lx}$ each corresponding to a respective HDD LBA range Lx specified in LBA mapping 210. As a cache controller operates to variously evict compressed data from LBA ranges of cache memory 220, read compressed data of LBA ranges of cache memory 220 and/or write compressed data to LBA ranges of cache memory 220, LBA mapping 210 and/or other such reference information may be updated to reflect such accesses. This may include updating LBA mapping 210 to identify more or fewer LBA ranges, a change to a size of a cache LBA range and/or a change of a correspondence of a cache LBA range to a HDD range.

The reference information may additionally or alternatively indicate for each of one or more LBA ranges a respective recency of use of the LBA range. One example of such recency information is represented by the illustrative least recently used (LRU) lists 230 of FIG. 2D. The LRU lists 230 may arrange listings of slots (LBA ranges) according to their respective sizes and, in some embodiments, further according to a relative recency of use among slots of the same size. In an embodiment, a cache controller may identify a size of compressed data to be cached, and based on that size, access the list in LRU lists 230 that corresponds to that size. From the selected list, a preferred slot may be selected as the slot to cache the compressed data. Recency of use may refer to a duration of time since a given slot has been written to, read from updated and/or otherwise accessed.

In an embodiment, reference information may additionally or alternatively specify one or more LBA ranges that are free to store compressed data. One example of such reference information is represented by the illustrative free slot list 240 of FIG. 2E. The free slot list 240 may arrange listings of free slots—e.g., which do not currently store valid data—according to their respective sizes. In an embodiment, a cache controller may identify a size of compressed data to be cached, and based on that size, determine the slots listed in free slot list 240 as corresponding to that size. From the free slots of that size, a slot may be selected as the slot to cache the compressed data.

In eviction of a clean cache line on a SSD (or other device serving as cache), the cache line may, in an embodiment, be simply marked as trimmed, and LBA mapping 210 and LRU lists 230 updated to remove references to the evicted cacheline. The trimmed space may be added to free slot lists 240. In eviction of a dirty cache line, compressed data may be read from cache (as in read-hits), written to the HDD (or other peripheral storage), and then the clean eviction process is used. On read and write misses, the cache controller may decide—e.g., based at least in part on conventional caching decision criteria—whether to insert the data in the cache. If it chooses to insert the data, then insertion processes discussed herein may be used. On read-hits, the corresponding cache LBA range may be looked up in LBA mapping 210, along with the compressed size, and a corresponding read request may be issued to the cache for the data. The corresponding one of LRU lists 230 may be updated accordingly. On write-hits, the cache may need to update the data in the cache. Since the new data may compress differently than the old data, the cache may not always be able to simply update the data in place. Therefore, the cache may be operated to compresses the new data and determine the compressed size, e.g., as discussed herein. If the new compressed size and the old compressed size need the same minimum number of sectors (determined using a lookup in LBA mapping 210), then the data may be updated in place. Otherwise, the cache must use an evict procedure for the old data, followed by a new insert procedure based on the new compressed data size.

Figure 4:
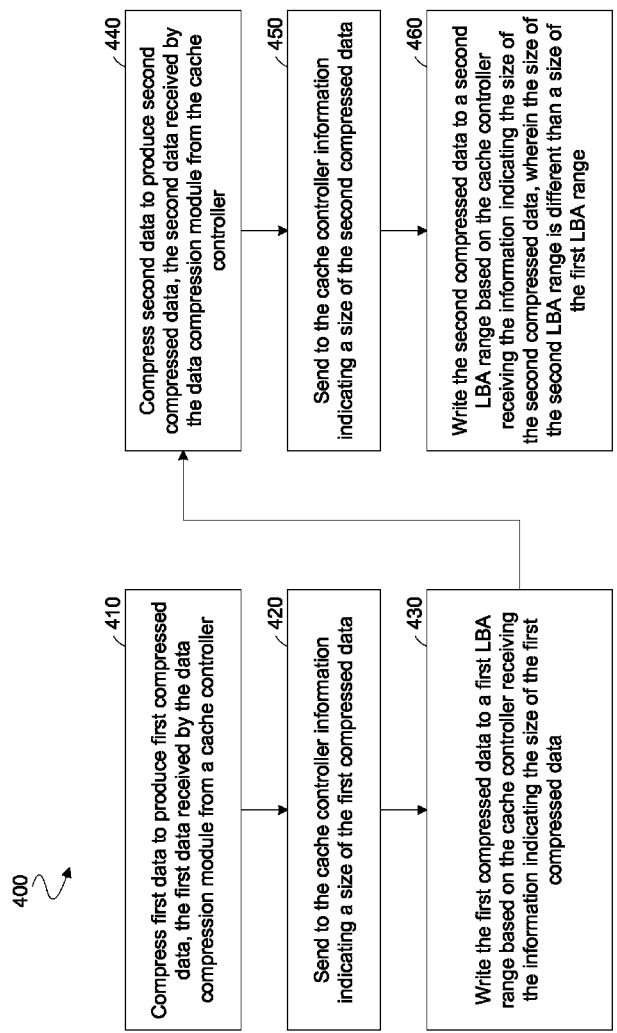
FIG. 4 is a flow diagram illustrating elements of a method for providing data compression information to a cache controller according to an embodiment.

Reference is now made to FIG. 4, which is a flow diagram of example operations of a data compression module consistent with one example method 400 of compressing data consistent with the present disclosure. Method 400 may be performed with logic having some or all of the features of cache device 102, for example. Such logic may operate with a cache controller that performs method 300.

As shown, method 400 may include, at 410, compressing first data to produce first compressed data, the first data received by a data compression module from a cache controller. In an embodiment, method 400 includes, at 420, sending to the cache controller information indicating a size of the first compressed data. The information sent at 420 may include a value specifying the size of the first compressed data and/or a compression factor determined based on the compression performed at 410. In an embodiment, the cache controller identifies a first LBA range of a cache memory based on the size of the first compressed data and the size of the first LBA range. The first LBA range may, for example, be the first LBA range identified at 330. Method 400 may further comprise, at 430, writing the first compressed data to the first LBA range based on the cache controller receiving the information indicating the size of the first compressed data. For example, the cache controller may identify to the device performing method 400 the first LBA as a destination for the writing of the first compressed data.

Method 400 may further include, at 440, compressing second data to produce second compressed data, the second data received by a data compression module from a cache controller. In an embodiment, method 400 includes, at 450, sending to the cache controller information indicating a size of the second compressed data. The information sent at 450 may include a value specifying the size of the second compressed data and/or a compression factor determined based on the compression performed at 440. In an embodiment, the cache controller identifies a second LBA range of a cache memory based on the size of the second compressed data and the size of the second LBA range. Method 400 may further comprise, at 460, writing the second compressed data to the second LBA range based on the cache controller receiving the information indicating the size of the second compressed data. For example, the cache controller may identify to the device performing method 400 the second LBA as a destination for the writing of the first compressed data. In an embodiment, the first LBA stores the first compressed data while the second LBA stores that second compressed data—e.g., where first LBA and the second LBA have different respective sizes and the first compressed data and the second compressed data have different respective sizes.

In one implementation, a device comprises a cache controller module including circuitry configured to transmit to a compression engine a first compress command comprising first data, wherein in response to the first compress command, the compression engine compresses the first data to produce first compressed data, determine a size of the first compressed data, identify a first logical block address (LBA) range of a memory of a cache device, wherein the first LBA range is identified based on the size of the first compressed data and reference information specifying a plurality of LBA ranges of the memory, the plurality of LBA ranges including LBA ranges of different respective sizes. Based on identification of the first LBA range, the cache controller module is further to update the reference information to indicate that the first LBA range is allocated to the first compressed data, and signal that the first compressed data is to be written to the first LBA range.

In an embodiment, the cache controller is further to determine a size of second compressed data other than any compressed data generated based on the first compress command, wherein the size of the second compressed data differs from the size of the first compressed data, and identify a second LBA range of a memory of a cache device, wherein the second LBA range is identified based on the size of the second compressed data and the reference information. Based on identification of the second LBA range, the cache controller module is to update the reference information to indicate that the second LBA range is allocated to the second compressed data, and signal that the second compressed data is to be written to the second LBA range, wherein the first LBA range stores the first compressed data while the second LBA range stores the second compressed data.

In another embodiment, the cache controller module is further configured to associate the first data with a first tag and to transmit the first tag in the first compress command. In another embodiment, the cache controller module to signal that the first compressed data is to be written to the first LBA range includes the cache controller module to issues a write command containing the tag and the first LBA range to the cache device. In another embodiment, the cache controller module to identify the first LBA range includes the cache controller module to identify second compressed data to evict from the memory. In another embodiment, a storage device other than the cache device stores a version of the first data while the first LBA range stores the first compressed data, and wherein, for each of the plurality of LBA ranges, wherein the reference information specifies a size of the LBA range, and a different respective logical base address of the storage device as corresponding to the LBA range.

In another embodiment, the reference information identifies one or more LBA ranges other than any LBA ranges of the memory that currently store valid data, and wherein the reference information further identifies for each of the one or more LBA ranges a respective size of the LBA range. In another embodiment, for each of the plurality of LBA ranges, the reference information specifies a recency of use of the LBA range, wherein the cache controller module to identify the first LBA range based on a recency of use of the first LBA range. In another embodiment, the cache controller module to identify the first LBA range includes the cache controller module to identify a subset of the plurality of LBA ranges based on the LBA ranges of the subset each having a total number of sectors of the LBA range that is equal to a minimum number of sectors sufficient to store the first compressed data, and the cache controller module to select the first LBA range from among only the subset. In another embodiment, the cache controller module is to select the first LBA range from among only the subset based on the first LBA range being a least recently used LBA range of the subset. In another embodiment, the cache controller module to identify the first LBA range includes the cache controller module to identify a subset of the plurality of LBA ranges based on the LBA ranges of the subset each having a total number of sectors of the LBA range that is closest to a minimum number of sectors sufficient to store the first compressed data, and the cache controller module to select the first LBA range from among only the subset.

In another implementation, a method at a cache controller comprises transmitting to a compression engine a first compress command comprising first data, wherein in response to the first compress command, the compression engine compresses the first data to produce first compressed data, determining a size of the first compressed data, identifying a first logical block address (LBA) range of a memory of a cache device, wherein the first LBA range is identified based on the size of the first compressed data and reference information specifying a plurality of LBA ranges of the memory, the plurality of LBA ranges including LBA ranges of different respective sizes, and based on identification of the first LBA range, updating the reference information to indicate that the first LBA range is allocated to the first compressed data, and signaling that the first compressed data is to be written to the first LBA range.

In an embodiment, the method further comprises determining a size of second compressed data other than any compressed data generated based on the first compress command, wherein the size of the second compressed data differs from the size of the first compressed data, identifying a second LBA range of a memory of a cache device, wherein the second LBA range is identified based on the size of the second compressed data and the reference information, and based on identification of the second LBA range updating the reference information to indicate that the second LBA range is allocated to the second compressed data, and signaling that the second compressed data is to be written to the second LBA range, wherein the first LBA range stores the first compressed data while the second LBA range stores the second compressed data.

In another embodiment, the method further comprises associating the first data with a first tag, and including the first tag in the first compress command. In another embodiment, signaling that the first compressed data is to be written to the first LBA range includes issuing a write command containing the tag and the first LBA range. In another embodiment, identifying the first LBA range includes identifying second compressed data to evict from the memory. In another embodiment, a storage device other than the cache device stores a version of the first data while the first LBA range stores the first compressed data, and wherein, for each of the plurality of LBA ranges, and the reference information specifies a size of the LBA range, and a different respective logical base address of the storage device as corresponding to the LBA range.

In another embodiment, the reference information identifies one or more LBA ranges other than any LBA ranges of the memory that currently store valid data, wherein the reference information further identifies for each of the one or more LBA ranges a respective size of the LBA range. In another embodiment, for each of the plurality of LBA ranges, the reference information specifies a recency of use of the LBA range, wherein identifying the first LBA range is based on a recency of use of the first LBA range. In another embodiment, identifying the first LBA range includes identifying a subset of the plurality of LBA ranges based on the LBA ranges of the subset each having a total number of sectors of the LBA range that is equal to a minimum number of sectors sufficient to store the first compressed data, and selecting the first LBA range from among only the subset. In another embodiment, selecting the first LBA range from among only the subset is based on the first LBA range being a least recently used LBA range of the subset. In another embodiment, identifying the first LBA range includes identifying a subset of the plurality of LBA ranges based on the LBA ranges of the subset each having a total number of sectors of the LBA range that is closest to a minimum number of sectors sufficient to store the first compressed data, and selecting the first LBA range from among only the subset.

In another implementation, a computer-readable storage medium having stored thereon instructions which, when executed by one or more processing units, cause a cache controller to perform a method comprising transmitting to a compression engine a first compress command comprising first data, wherein in response to the first compress command, the compression engine compresses the first data to produce first compressed data, determining a size of the first compressed data, and identifying a first logical block address (LBA) range of a memory of a cache device, wherein the first LBA range is identified based on the size of the first compressed data and reference information specifying a plurality of LBA ranges of the memory, the plurality of LBA ranges including LBA ranges of different respective sizes. The method further comprises, based on identification of the first LBA range, updating the reference information to indicate that the first LBA range is allocated to the first compressed data, and signaling that the first compressed data is to be written to the first LBA range.

In an embodiment, the method further comprises determining a size of second compressed data other than any compressed data generated based on the first compress command, wherein the size of the second compressed data differs from the size of the first compressed data, and identifying a second LBA range of a memory of a cache device, wherein the second LBA range is identified based on the size of the second compressed data and the reference information. The method further comprises, based on identification of the second LBA range, updating the reference information to indicate that the second LBA range is allocated to the second compressed data, and signaling that the second compressed data is to be written to the second LBA range, wherein the first LBA range stores the first compressed data while the second LBA range stores the second compressed data.

In another embodiment, the method further comprises associating the first data with a first tag, and including the first tag in the first compress command. In another embodiment, signaling that the first compressed data is to be written to the first LBA range includes issuing a write command containing the tag and the first LBA range. In another embodiment, identifying the first LBA range includes identifying second compressed data to evict from the memory. In another embodiment, a storage device other than the cache device stores a version of the first data while the first LBA range stores the first compressed data, and wherein, for each of the plurality of LBA ranges, and the reference information specifies a size of the LBA range, and a different respective logical base address of the storage device as corresponding to the LBA range.

In another embodiment, the reference information identifies one or more LBA ranges other than any LBA ranges of the memory that currently store valid data, wherein the reference information further identifies for each of the one or more LBA ranges a respective size of the LBA range. In another embodiment, for each of the plurality of LBA ranges, the reference information specifies a recency of use of the LBA range, wherein identifying the first LBA range is based on a recency of use of the first LBA range. In another embodiment, identifying the first LBA range includes identifying a subset of the plurality of LBA ranges based on the LBA ranges of the subset each having a total number of sectors of the LBA range that is equal to a minimum number of sectors sufficient to store the first compressed data, and selecting the first LBA range from among only the subset. In another embodiment, selecting the first LBA range from among only the subset is based on the first LBA range being a least recently used LBA range of the subset. In another embodiment, identifying the first LBA range includes identifying a subset of the plurality of LBA ranges based on the LBA ranges of the subset each having a total number of sectors of the LBA range that is closest to a minimum number of sectors sufficient to store the first compressed data, and selecting the first LBA range from among only the subset.

In another implementation, a system comprises a cache device including a memory and a compression, a cache controller coupled to the cache device, the cache controller including circuitry configured to transmit to the compression engine a first compress command comprising first data, wherein in response to the first compress command, the compression engine compresses the first data to produce first compressed data, determine a size of the first compressed data, and identify a first logical block address (LBA) range of a memory of the cache device, wherein the first LBA range is identified based on the size of the first compressed data and reference information specifying a plurality of LBA ranges of the memory, the plurality of LBA ranges including LBA ranges of different respective sizes. Based on identification of the first LBA range, the cache controller is further to update the reference information to indicate that the first LBA range is allocated to the first compressed data, and signal that the first compressed data is to be written to the first LBA range.

In an embodiment, the cache controller is further to determine a size of second compressed data other than any compressed data generated based on the first compress command, wherein the size of the second compressed data differs from the size of the first compressed data, identify a second LBA range of a memory of a cache device, wherein the second LBA range is identified based on the size of the second compressed data and the reference information, and based on identification of the second LBA range, to update the reference information to indicate that the second LBA range is allocated to the second compressed data, and signal that the second compressed data is to be written to the second LBA range, wherein the first LBA range stores the first compressed data while the second LBA range stores the second compressed data.

In another embodiment, the cache controller is further configured to associate the first data with a first tag and to transmit the first tag in the first compress command. In another embodiment, the cache controller to signal that the first compressed data is to be written to the first LBA range includes the cache controller to issues a write command containing the tag and the first LBA range to the cache device. In another embodiment, the cache controller to identify the first LBA range includes the cache controller to identify second compressed data to evict from the memory. In another embodiment, a storage device other than the cache device stores a version of the first data while the first LBA range stores the first compressed data, wherein, for each of the plurality of LBA ranges, the reference information specifies a size of the LBA range, and a different respective logical base address of the storage device as corresponding to the LBA range. In another embodiment, the reference information identifies one or more LBA ranges other than any LBA ranges of the memory that currently store valid data, and wherein the reference information further identifies for each of the one or more LBA ranges a respective size of the LBA range.

In another embodiment, for each of the plurality of LBA ranges, the reference information specifies a recency of use of the LBA range, wherein the cache controller to identify the first LBA range based on a recency of use of the first LBA range. In another embodiment, the cache controller to identify the first LBA range includes the cache controller to identify a subset of the plurality of LBA ranges based on the LBA ranges of the subset each having a total number of sectors of the LBA range that is equal to a minimum number of sectors sufficient to store the first compressed data, and the cache controller to select the first LBA range from among only the subset. In another embodiment, the cache controller is to select the first LBA range from among only the subset based on the first LBA range being a least recently used LBA range of the subset. In another embodiment, the cache controller to identify the first LBA range includes the cache controller to identify a subset of the plurality of LBA ranges based on the LBA ranges of the subset each having a total number of sectors of the LBA range that is closest to a minimum number of sectors sufficient to store the first compressed data, and the cache controller to select the first LBA range from among only the subset.

In another implementation, a cache memory device comprises a data compression module including circuitry configured to compress first data to produce first compressed data, the first data received by the data compression module from a cache controller, send to the cache controller information indicating a size of the first compressed data, wherein the cache controller identifies a first logical block address (LBA) range of a memory of a cache device based on the size of the first compressed data and the size of the first LBA range, write the first compressed data to the first LBA range based on the cache controller receiving the information indicating the size of the first compressed data, and compress second data to produce second compressed data, the second data received from the cache controller. The data compression module is further to send to the cache controller information indicating a size of the second compressed data, wherein the cache controller identifies a second LBA range of a memory of a cache device based on the size of the second compressed data and the size of the second LBA range, wherein the size of the second LBA range is different than a size of the first LBA range, and write the second compressed data to the second LBA range based on the cache controller receiving the information indicating the size of the second compressed data.

In an embodiment, the cache controller identifies the first LBA range based on reference information specifying a plurality of LBA ranges of the memory, the plurality of LBA ranges including LBA ranges of different respective sizes. In another embodiment, a storage device other than the cache device stores a version of the first data while the first LBA range stores the first compressed data, wherein, for each of the plurality of LBA ranges, the reference information specifies a size of the LBA range, and a different respective logical base address of the storage device as corresponding to the LBA range. In an embodiment, the reference information identifies one or more LBA ranges other than any LBA ranges of the memory that currently store valid data, and wherein the reference information further identifies for each of the one or more LBA ranges a respective size of the LBA range. In an embodiment, for each of the plurality of LBA ranges, the reference information specifies a recency of use of the LBA range, wherein the cache controller module to identify the first LBA range based on a recency of use of the first LBA range.

In another implementation, a method at a cache memory device comprises compressing first data to produce first compressed data, the first data received by the data compression module from a cache controller, sending to the cache controller information indicating a size of the first compressed data, wherein the cache controller identifies a first logical block address (LBA) range of a memory of a cache device based on the size of the first compressed data and the size of the first LBA range, writing the first compressed data to the first LBA range based on the cache controller receiving the information indicating the size of the first compressed data. The method further comprises compressing second data to produce second compressed data, the second data received from the cache controller, sending to the cache controller information indicating a size of the second compressed data, wherein the cache controller identifies a second LBA range of a memory of a cache device based on the size of the second compressed data and the size of the second LBA range, wherein the size of the second LBA range is different than a size of the first LBA range, and writing the second compressed data to the second LBA range based on the cache controller receiving the information indicating the size of the second compressed data.

In an embodiment, the cache controller identifies the first LBA range based on reference information specifying a plurality of LBA ranges of the memory, the plurality of LBA ranges including LBA ranges of different respective sizes. In another embodiment, a storage device other than the cache device stores a version of the first data while the first LBA range stores the first compressed data, and wherein, for each of the plurality of LBA ranges, the reference information specifies a size of the LBA range, and a different respective logical base address of the storage device as corresponding to the LBA range. In another embodiment, the reference information identifies one or more LBA ranges other than any LBA ranges of the memory that currently store valid data, and wherein the reference information further identifies for each of the one or more LBA ranges a respective size of the LBA range. In another embodiment, for each of the plurality of LBA ranges, the reference information specifies a recency of use of the LBA range, wherein the cache controller module to identify the first LBA range based on a recency of use of the first LBA range.

What is claimed is:

1. A device comprising:
  a cache controller module including circuitry configured to:
    transmit to a compression engine a first compress command comprising first data, wherein in response to the first compress command, the compression engine compresses the first data to produce first compressed data;
    determine a size of the first compressed data;
    identify a first logical block address (LBA) range of a memory of a cache device, wherein the first LBA range is identified based on the size of the first compressed data and further based on reference information specifying a plurality of LBA ranges of the memory, the plurality of LBA ranges including LBA ranges of different respective sizes, wherein the cache controller to identify the first LBA range based on the reference information includes the cache controller to identify the first LBA range based on a plurality of lists each corresponding to a different respective slot size, the plurality of lists arranged according to slot size, wherein, for each list of the plurality of lists:
      the list identifies a respective one or more LBA ranges of the memory, the one or more LBA ranges each of the corresponding slot size, wherein the list is arranged according to a relative recency of use among LBA ranges of the corresponding slot size; and
    based on identification of the first LBA range, to:
      update the reference information to indicate that the first LBA range is allocated to the first compressed data; and
      signal that the first compressed data is to be written to the first LBA range.

2. The device of claim 1, the cache controller further to:
  determine a size of second compressed data other than any compressed data generated based on the first compress command, wherein the size of the second compressed data differs from the size of the first compressed data;
  identify a second LBA range of a memory of a cache device, wherein the second LBA range is identified based on the size of the second compressed data and the reference information; and
  based on identification of the second LBA range, to:
    update the reference information to indicate that the second LBA range is allocated to the second compressed data; and
    signal that the second compressed data is to be written to the second LBA range;

wherein the first LBA range stores the first compressed data while the second LBA range stores the second compressed data.

3. The device of claim 1, the cache controller module further configured to associate the first data with a first tag and to transmit the first tag in the first compress command.

4. The device of claim 3, wherein the cache controller module to signal that the first compressed data is to be written to the first LBA range includes the cache controller module to issue a write command containing the tag and the first LBA range to the cache device.

5. The device of claim 1, wherein the cache controller module to identify the first LBA range includes the cache controller module to identify second compressed data to evict from the memory.

6. The device of claim 1, wherein a storage device other than the cache device stores a version of the first data while the first LBA range stores the first compressed data, and wherein, for each of the plurality of LBA ranges, the reference information specifies:
a size of the LBA range; and
a different respective logical base address of the storage device as corresponding to the LBA range.

7. The device of claim 1, wherein the reference information identifies one or more LBA ranges other than any LBA ranges of the memory that currently store valid data, and wherein the reference information further identifies for each of the one or more LBA ranges a respective size of the LBA range.

8. The device of claim 1, wherein the cache controller module to identify the first LBA range includes:
the cache controller module to identify a subset of the plurality of LBA ranges based on the LBA ranges of the subset each having a total number of sectors of the LBA range that is equal to a minimum number of sectors sufficient to store the first compressed data; and
the cache controller module to select the first LBA range from among only the subset.

9. The device of claim 8, wherein the cache controller module to select the first LBA range from among only the subset based on the first LBA range being a least recently used LBA range of the subset.

10. The device of claim 1, wherein the cache controller module to identify the first LBA range includes:
the cache controller module to identify a subset of the plurality of LBA ranges based on the LBA ranges of the subset each having a total number of sectors of the LBA range that is closest to a minimum number of sectors sufficient to store the first compressed data; and
the cache controller module to select the first LBA range from among only the subset.

11. A method at a cache controller, the method comprising:
transmitting to a compression engine a first compress command comprising first data, wherein in response to the first compress command, the compression engine compresses the first data to produce first compressed data;
determining a size of the first compressed data;
identifying a first logical block address (LBA) range of a memory of a cache device, wherein the first LBA range is identified based on the size of the first compressed data and further based on reference information specifying a plurality of LBA ranges of the memory, the plurality of LBA ranges including LBA ranges of different respective sizes, wherein identifying the first LBA range based on the reference information includes identifying the first LBA range based on a plurality of lists each corresponding to a different respective slot size, the plurality of lists arranged according to slot size, wherein, for each list of the plurality of lists:
the list identifies a respective one or more LBA ranges of the memory, the one or more LBA ranges each of the corresponding slot size, wherein the list is arranged according to a relative recency of use among LBA ranges of the corresponding slot size; and
based on identification of the first LBA range:
updating the reference information to indicate that the first LBA range is allocated to the first compressed data; and
signaling that the first compressed data is to be written to the first LBA range.

12. The method of claim 11, further comprising:
determining a size of second compressed data other than any compressed data generated based on the first compress command, wherein the size of the second compressed data differs from the size of the first compressed data;
identifying a second LBA range of a memory of a cache device, wherein the second LBA range is identified based on the size of the second compressed data and the reference information; and
based on identification of the second LBA range:
updating the reference information to indicate that the second LBA range is allocated to the second compressed data; and
signaling that the second compressed data is to be written to the second LBA range;
wherein the first LBA range stores the first compressed data while the second LBA range stores the second compressed data.

13. The method of claim 11, wherein identifying the first LBA range includes:
identifying a subset of the plurality of LBA ranges based on the LBA ranges of the subset each having a total number of sectors of the LBA range that is closest to a minimum number of sectors sufficient to store the first compressed data; and
selecting the first LBA range from among only the subset.

14. A computer-readable storage medium having stored thereon instructions which, when executed by one or more processing units, cause a cache controller to perform a method comprising:
transmitting to a compression engine a first compress command comprising first data, wherein in response to the first compress command, the compression engine compresses the first data to produce first compressed data;
determining a size of the first compressed data;
identifying a first logical block address (LBA) range of a memory of a cache device, wherein the first LBA range is identified based on the size of the first compressed data and further based on reference information specifying a plurality of LBA ranges of the memory, the plurality of LBA ranges including LBA ranges of different respective sizes, wherein identifying the first LBA range based on the reference information includes identifying the first LBA range based on a plurality of lists each corresponding to a different respective slot size, the plurality of lists arranged according to slot size, wherein, for each list of the plurality of lists:
the list identifies a respective one or more LBA ranges of the memory, the one or more LBA ranges each of the corresponding slot size, wherein the list is arranged according to a relative recency of use among LBA ranges of the corresponding slot size; and based on identification of the first LBA range:
   updating the reference information to indicate that the first LBA range is allocated to the first compressed data; and
   signaling that the first compressed data is to be written to the first LBA range.

15. The computer-readable storage medium of claim 14, the method further comprising:
   determining a size of second compressed data other than any compressed data generated based on the first compress command, wherein the size of the second compressed data differs from the size of the first compressed data;
   identifying a second LBA range of a memory of a cache device, wherein the second LBA range is identified based on the size of the second compressed data and the reference information; and
   based on identification of the second LBA range:
      updating the reference information to indicate that the second LBA range is allocated to the second compressed data; and
      signaling that the second compressed data is to be written to the second LBA range;
   wherein the first LBA range stores the first compressed data while the second LBA range stores the second compressed data.

16. The computer-readable storage medium of claim 14, wherein the reference information identifies one or more LBA ranges other than any LBA ranges of the memory that currently store valid data, and wherein the reference information further identifies for each of the one or more LBA ranges a respective size of the LBA range.

17. The computer-readable storage medium of claim 14, wherein identifying the first LBA range includes:
   identifying a subset of the plurality of LBA ranges based on the LBA ranges of the subset each having a total number of sectors of the LBA range that is equal to a minimum number of sectors sufficient to store the first compressed data; and
   selecting the first LBA range from among only the subset.

18. The computer-readable storage medium of claim 17, wherein selecting the first LBA range from among only the subset is based on the first LBA range being a least recently used LBA range of the subset.

19. A system comprising:
   a cache device including a memory and a compression;
   a cache controller coupled to the cache device, the cache controller including circuitry configured to:
      transmit to the compression engine a first compress command comprising first data, wherein in response to the first compress command, the compression engine compresses the first data to produce first compressed data;
      determine a size of the first compressed data;
      identify a first logical block address (LBA) range of a memory of the cache device, wherein the first LBA range is identified based on the size of the first compressed data and further based on reference information specifying a plurality of LBA ranges of the memory, the plurality of LBA ranges including LBA ranges of different respective sizes, wherein the cache controller to identify the first LBA range based on the reference information includes the cache controller to identify the first LBA range based on a plurality of lists each corresponding to a different respective slot size, the plurality of lists arranged according to slot size, wherein, for each list of the plurality of lists:
         the list identifies a respective one or more LBA ranges of the memory, the one or more LBA ranges each of the corresponding slot size, wherein the list is arranged according to a relative recency of use among LBA ranges of the corresponding slot size; and
      based on identification of the first LBA range, to:
         update the reference information to indicate that the first LBA range is allocated to the first compressed data; and
         signal that the first compressed data is to be written to the first LBA range.

20. The system of claim 19, the cache controller further to:
   determine a size of second compressed data other than any compressed data generated based on the first compress command, wherein the size of the second compressed data differs from the size of the first compressed data;
   identify a second LBA range of a memory of a cache device, wherein the second LBA range is identified based on the size of the second compressed data and the reference information; and
   based on identification of the second LBA range, to:
      update the reference information to indicate that the second LBA range is allocated to the second compressed data; and
      signal that the second compressed data is to be written to the second LBA range;
   wherein the first LBA range stores the first compressed data while the second LBA range stores the second compressed data.

21. The system of claim 19, wherein the cache controller to identify the first LBA range includes:
   the cache controller to identify a subset of the plurality of LBA ranges based on the LBA ranges of the subset each having a total number of sectors of the LBA range that is equal to a minimum number of sectors sufficient to store the first compressed data; and
   the cache controller to select the first LBA range from among only the subset.

* * * * *

UNITED STATES PATENT AND TRADEMARK OFFICE
CERTIFICATE OF CORRECTION

PATENT NO.       : 9,652,384 B2                                 Page 1 of 1
APPLICATION NO.  : 14/572689
DATED            : May 16, 2017
INVENTOR(S)      : Sanjeev N. Trika and Rowel S. Garcia It is certified that error appears in the above-identified patent and that said Letters Patent is hereby corrected as shown below:

In the Claims

In Claim Number 19, at Column 27, Line 50 insert --engine-- after the word "compression."

Signed and Sealed this
Fourth Day of July, 2017

Joseph Matal
*Performing the Functions and Duties of the*
*Under Secretary of Commerce for Intellectual Property and*
*Director of the United States Patent and Trademark Office*